US011113339B2

(12) United States Patent
Arasachetty et al.

(10) Patent No.: US 11,113,339 B2
(45) Date of Patent: Sep. 7, 2021

(54) SYSTEM AND METHOD FOR FEDERATED CONTENT MANAGEMENT USING A FEDERATED LIBRARY AND FEDERATED METADATA PROPAGATION

(71) Applicant: ORACLE INTERNATIONAL CORPORATION, Redwood Shores, CA (US)

(72) Inventors: Bhageerath Arasachetty, Bangalore (IN); Shyam Babu Prasad, Bangalore (IN); Praveen Kumar Jayaram, Bangalore (IN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 450 days.

(21) Appl. No.: 15/870,474

(22) Filed: Jan. 12, 2018

(65) Prior Publication Data

US 2019/0220550 A1 Jul. 18, 2019

(51) Int. Cl.
*G06F 16/00* (2019.01)
*G06F 16/907* (2019.01)
(Continued)

(52) U.S. Cl.
CPC ............ *G06F 16/907* (2019.01); *G06F 16/22* (2019.01); *G06F 16/23* (2019.01); *G06F 16/256* (2019.01); *G06F 16/28* (2019.01)

(58) Field of Classification Search
CPC ........ G06F 16/907; G06F 16/22; G06F 16/23; G06F 16/256; G06F 16/28
See application file for complete search history.

(56) References Cited

U.S. PATENT DOCUMENTS 6,263,342 B1 * 7/2001 Chang .................. G06F 16/2452
6,272,488 B1 * 8/2001 Chang .................... G06F 16/256
707/769

(Continued)

OTHER PUBLICATIONS

IBM Web Content Manager, "Configuring remote server access for finks", 6 pages. Retrieved on Aug. 8, 2017 from http://infolib.lotus.com/resources/portal/7.0.0/doc/en_us/pt700abd004/html-wrapper-wcm.html.

(Continued)

*Primary Examiner* — Jared M Bibbee
(74) *Attorney, Agent, or Firm* — Tucker Ellis LLP

(57) ABSTRACT

In accordance with an embodiment, a system and method is described for enabling federated content management using a federated library and federated metadata propagation. The system can include a plurality of content servers, each including a processor and configured to store content items at a respective content database. The system can also include a federated library configured to store content items received from the plurality of content servers, as federated content items accessible to each content server of the plurality of content servers, and a federated database configured to receive and store metadata associated with the federated content items. The system can also include a federative agent associated with each content server and configured to communicate the metadata between the plurality of content servers and the federated database. In an embodiment, the system can be provided as a reusable, pluggable component for use with existing content management systems.

20 Claims, 11 Drawing Sheets

(51) Int. Cl.
*G06F 16/22* (2019.01)
*G06F 16/23* (2019.01)
*G06F 16/28* (2019.01)
*G06F 16/25* (2019.01)

(56) References Cited

U.S. PATENT DOCUMENTS

| | | | |
|---|---|---|---|
| 6,622,167 B1* | 9/2003 | Keesey | G06F 16/9574 |
| | | | 709/219 |
| 7,533,115 B2 | 5/2009 | Chou et al. | |
| 7,702,636 B1 | 4/2010 | Sholtis et al. | |
| 8,001,154 B2* | 8/2011 | Brito | G06F 16/248 |
| | | | 707/796 |
| 8,099,779 B2 | 1/2012 | Owen et al. | |
| 8,464,206 B2 | 6/2013 | Jenkins et al. | |
| 9,213,858 B2 | 12/2015 | Sharma et al. | |
| 2003/0200220 A1* | 10/2003 | Hu | G06F 16/284 |
| 2004/0039754 A1* | 2/2004 | Harple, Jr. | G06F 16/958 |
| 2004/0168084 A1* | 8/2004 | Owen | G06F 21/10 |
| | | | 726/26 |
| 2005/0060337 A1* | 3/2005 | Chou | G06F 16/24539 |
| 2005/0203931 A1* | 9/2005 | Pingree | G06F 16/951 |
| 2007/0073673 A1* | 3/2007 | McVeigh | G06F 21/62 |
| 2007/0073674 A1* | 3/2007 | McVeigh | G06F 16/256 |
| 2007/0214148 A1* | 9/2007 | Bodin | H04L 29/06027 |
| 2009/0182662 A1 | 7/2009 | Alkove et al. | |
| 2009/0327226 A1* | 12/2009 | Brito | G06F 16/248 |
| 2014/0282910 A1* | 9/2014 | Palmer | H04L 63/10 |
| | | | 726/4 |
| 2016/0140139 A1* | 5/2016 | Torres | G06Q 10/10 |
| | | | 707/610 |
| 2017/0220605 A1* | 8/2017 | Nivala | G06F 16/9024 |

OTHER PUBLICATIONS

Tsalapatas, et al., "eCMS: eLearning Content Management Middleware", 16 pages. Retrieved on Aug. 3, 2017 from http://elearning.noc.uth.gr/public_docs/ecms_ECEL.I.pdf.

* cited by examiner

SYSTEM AND METHOD FOR FEDERATED CONTENT MANAGEMENT USING A FEDERATED LIBRARY AND FEDERATED METADATA PROPAGATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to systems for federated management of content, and are particularly related to a system and method for enabling federated content management using a federated library and federated metadata propagation.

BACKGROUND

Content management systems enable content to be created, uploaded, accessed, and modified by a plurality of users. For example, a content item such as a document can be created and uploaded by one user, and subsequently accessed and modified by other users. Additionally, a single document can be accessed (e.g., viewed) concurrently by multiple users. Content management systems can be useful for enterprises in which, for example, several individuals collaborate on a project by accessing the same document or set of documents.

In some cases, users interact with multiple content servers (content server instances) to interact with content items stored at different content servers. However, in order to access, revise, or apply processes to existing content items, a user must separately access the content servers where each content item was uploaded and stored. Additionally, each content server can have its own content management hierarchy, requiring a user who wishes to maintain consistency across content servers to manually download content locally and recreate a hierarchy from one instance to another.

SUMMARY

In accordance with an embodiment, a system and method is described for enabling federated content management using a federated library and federated metadata propagation. The system can include a plurality of content servers, each including a processor and configured to store content items at a respective content database. The system can also include a federated library configured to store content items received from the plurality of content servers, as federated content items accessible to each content server of the plurality of content servers, and a federated database configured to receive and store metadata associated with the federated content items. The system can also include a federative agent associated with each content server and configured to communicate the metadata between the plurality of content servers and the federated database. In an embodiment, the system can be provided as a reusable, pluggable component for use with existing content management systems.

DETAILED DESCRIPTION

The foregoing, together with other features, will become apparent upon referring to the enclosed specification, claims, and drawings. Specific details are set forth in order to provide an understanding of various embodiments. However, it will be apparent that various embodiments may be practiced without these specific details. The enclosed specification and drawings are not intended to be restrictive.

As described above, in some cases, users interact with multiple content servers (content server instances) to interact with content items stored at different content servers. However, in order to access, revise, or apply processes to existing content items, a user must separately access the content servers where each content item was uploaded and stored. Additionally, each content server can have its own content management hierarchy, requiring a user who wishes to maintain consistency across content servers to manually download content locally and recreate a hierarchy from one instance to another.

In accordance with an embodiment, a system and method is described for enabling federated content management using a federated library and federated metadata propagation. The system can include a plurality of content servers, each including a processor and configured to store content items at a respective content database. The system can also include a federated library configured to store content items received from the plurality of content servers, as federated content items accessible to each content server of the plurality of content servers, and a federated database configured to receive and store metadata associated with the federated content items. The system can also include a federative agent associated with each content server and configured to communicate the metadata between the plurality of content servers and the federated database. In an embodiment, the system can be provided as a reusable, pluggable component for use with existing content management systems.

Federated Enterprise Content Management System

Figure 1:
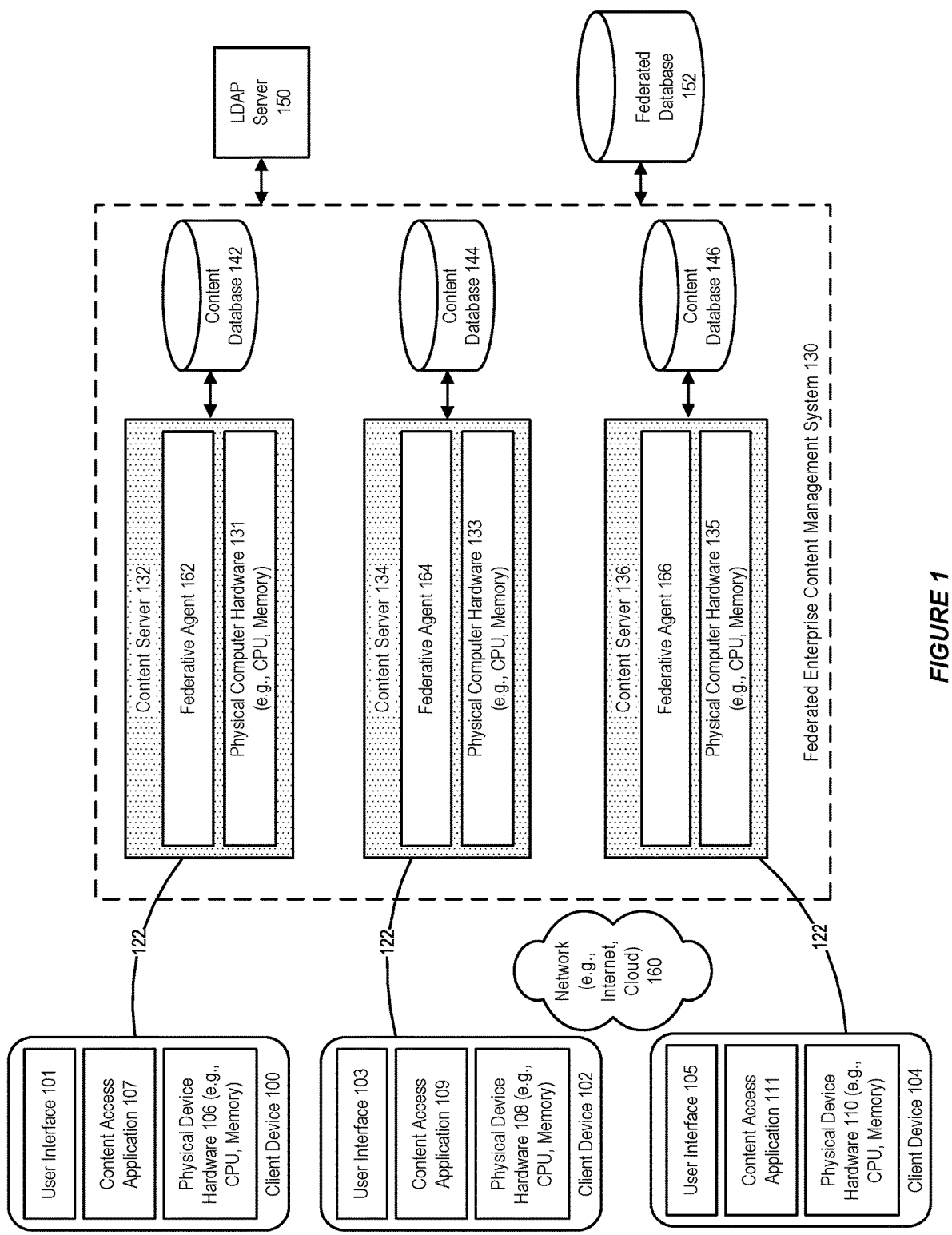
FIG. 1 illustrates a system for enabling federated content management, in accordance with an embodiment.

FIG. 1 illustrates a system for enabling federated content management, in accordance with an embodiment.

As illustrated in FIG. 1, in accordance with an embodiment, a federated enterprise content management system 130 includes a plurality of content servers 132, 134, 136 including physical computer hardware 131, 133, 135 (e.g., CPU, memory) and configured to store content items and associated metadata at respective content databases 142, 144, and 146.

In accordance with an embodiment, a plurality of client devices 100, 102, 104 can be configured to communicate 122 with one or more of the content servers via a network 160 (e.g., the Internet, or a cloud environment). Each client device can include a user interface 101, 103, 105, and physical hardware 106, 108, 110 (e.g., CPU, memory), and can be provided with a content access application 107, 109, 111 for execution thereon.

In accordance with an embodiment, each content server can include or be a platform for consolidating content that can be managed by a plurality of users of an enterprise. For example, a content server can be a human resources data management server such as Oracle Human Capital Management (Oracle HCM), a customer data management server such as Oracle Customer Relationship Management (Oracle CRM), or an enterprise resources management server such as Oracle Enterprise Resource Planning (Oracle ERP).

In accordance with an embodiment, each content server can be configured to communicate with a respective content database for storing content (or content items), and can deliver the content to users via their client devices. In accordance with an embodiment, the content database can be a relational database management system (RDBMS), file system, or other data source which the content server can access. Each content database can be an independent database for managing a corresponding content server's configurations, content items, and associated metadata.

In accordance with an embodiment, a respective content database can include or be configured to access a plurality of databases, including for example, a content database for storing content items, a metadata database for storing metadata associated with content items, and a search index for providing indexing and searching of content and data stored in the content database and the metadata database. In accordance with an embodiment, the search index can be a RDBMS or a search tool such as Oracle Secure Enterprise Search (Oracle SES).

In accordance with an embodiment, each content server can be configured to associate metadata with the content. Metadata can include information about an item of content, such as its title, author, release date, historical data such as who has accessed the item and when, a location where the content is stored, and the like.

In accordance with an embodiment, content stored within the content database can be checked out for modification or revision by a user at the user's client device, and checked back in to the enterprise content management system.

In accordance with an embodiment, a content access application at a client device can be configured to enable a user to create, upload, modify, delete, or otherwise access content items at each client device. Examples of content items can include, for example, documents, files, e-mails, memos, images, videos, slide presentations, conversations, or user profiles. For example, a content access application can receive a user input for adding or uploading (checking in) new content items to a content server. The system can transmit the content items to the corresponding content server for storage at a respective content database. Revisions or other processes can be applied to content items by receiving, at the content access application, a user input for applying the same, and in response thereto, metadata associated with the content items can be updated. The updated metadata can be stored at the respective content database.

In accordance with an embodiment, each content server within the federated enterprise content management system can include or be associated with a federative agent 162, 164, 166 for in communication with a federated database 152. Each federative agent can be configured to send (push) metadata associated with content items to the federated database.

In accordance with an embodiment, content items uploaded at content servers can be stored as federated content items, accessible to each content server, in one or more federated libraries provided by the system. In accordance with an embodiment, a federated library can be configured to serve as a shared repository between all of the content servers within the system. Content items can be stored in folders within a federated library.

In accordance with an embodiment, the federated database can be configured to receive and store metadata associated with federated content items. In an embodiment, the content servers within the system can be coupled to or otherwise in communication with the federated database, in addition to being coupled to or otherwise in communication with their respective content databases. In some embodiments, one or more of the content servers can be coupled to or otherwise in communication with a shared location instead of the federated database.

In accordance with an embodiment, the system can also include a Lightweight Directory Access Protocol (LDAP) server 150, which can enable synchronized login of a user to each of the content servers within the system.

In accordance with an embodiment, the federated enterprise content management system can be provided as a reusable, pluggable component for use with one or more existing content servers or content management system applications. The pluggable component can expose endpoints that enable any content management system application to communicate with other content management system applications as part of a federated enterprise content management system. For example, in accordance with an embodiment, the federated enterprise content management system can be a reusable, pluggable component installed within an enterprise content management system such as Oracle WebCenter Content (Oracle WCC).

In accordance with an embodiment, the federative agent can be included within the component installed at a particular content management system, and can enable configuration of settings to include the corresponding content server as part of the federated enterprise content management system. The federative agent can also be configured to request connection data associated with the federated database, during setup, to permit the content server to communicate with the federated database.

In accordance with an embodiment, a federated library can be provided as software or program code that is executable by a computer system or other processing device, and can be provided as part of the federated enterprise content management system software component, or separately, for example as firmware, to enable federated content items to be shared between content servers within the system. The federated library can be accessed by a user using a content access application at a client device.

Federated Library

Figure 2:
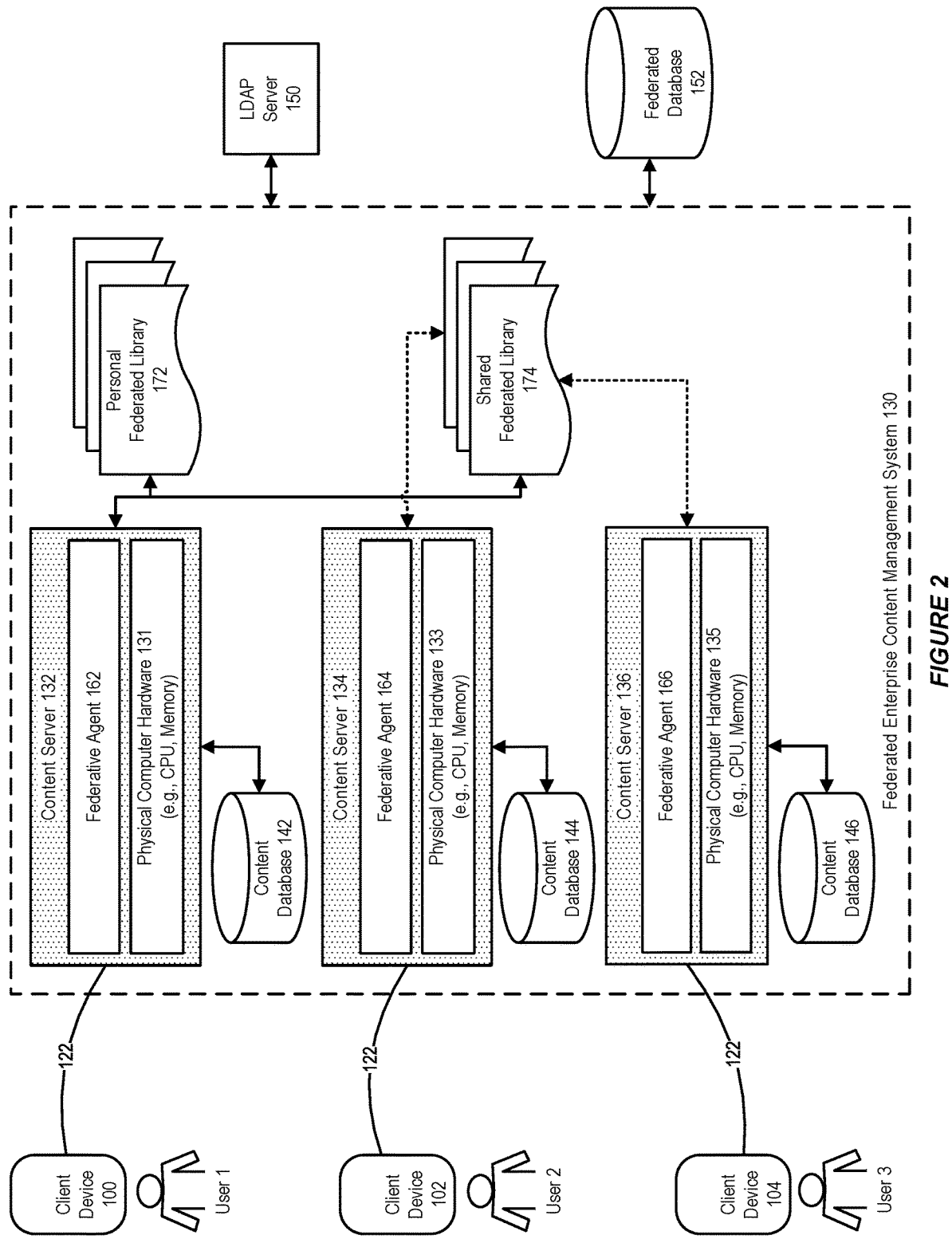
FIG. 2 illustrates a system for enabling federated content management, including the use of a federated library, in accordance with an embodiment.

FIG. 2 illustrates a system for enabling federated content management, including the use of a federated library, in accordance with an embodiment.

In accordance with an embodiment, the system can provide one or more federated libraries for storing content items and folders received from or otherwise associated with one or more of the content servers within the system.

In accordance with an embodiment, in addition to having Create, Read, Update, and Delete (CRUD) functionalities, the one or more federated libraries can be configured to make the stored federated content items accessible to each content server within the system.

In accordance with an embodiment, each content item within a federated library can have associated metadata that is received at the federated database in response to the federative agent pushing the metadata from the content server on which the content item or folder is physically stored, to the federated database.

In accordance with an embodiment, the system enables a user to move a content item or folder from a content server within the system to the federated library, to provide other content servers within the system with access to the content item. For example, the system can enable a user to log in to a content server within the system, create a folder and select content items for inclusion in the folder, and mark the folder as part of the federated library. In accordance with an embodiment, the federative agent can, in response to receiving an input indicative of marking a folder or content item as a federated content item or folder, mark the particular folder or content item as such and include or store it within the federated library, or otherwise create an association between the particular folder or content item with the federated library. In accordance with an embodiment, the actual content and metadata associated with the federated content item or folder can remain at the content server where it was uploaded.

In accordance with an embodiment, the federative agent can also be configured to, in response to receiving the input indicative of marking the folder or content item as a federated content item or folder, push metadata associated therewith to the federated database. In accordance with an embodiment, the federated database can be configured to serve as a central repository for metadata associated with federated content items or folders, so that metadata can be received from any content server within the system and stored therein.

In accordance with an embodiment, the system can be configured to enable a user to add content items or folders from any content server within the system to the federated library. A federated library can be personal or shared in nature. In accordance with an embodiment, in a shared federated library, federated content items are accessible to all content servers within the system and can be accessed by a plurality of users. In accordance with an embodiment, in a personal federated library, federated content items are accessible to all content servers within the system, but access to particular content items or folders can be restricted to a particular user.

For example, as illustrated in FIG. 2, in accordance with an embodiment, the system can include a personal federated library 172, which is associated with a particular user, User 1. The personal federated library can be shared between the content servers within the system, but access to content items within the personal federated library can be limited to User 1. The personal federated library can be designated or otherwise indicated as personal in response to receiving an input from User 1 marking the federated library as personal (not shared). Other users, such as User 2 and User 3, cannot access the content items stored within User 1's personal federated library. The personal federated library can include content items or folders received from one or more content servers within the system, and the system can be configured to enable User 1 to access the federated content items through any of the content servers within the system, including content servers 132, 134, and 136.

As further illustrated in FIG. 2, in accordance with an embodiment, the system can include a shared federated library 174. The shared federated library can be shared between the content servers within the system, and access to content items within the shared federated library can be made accessible to a plurality of users, including User 1, User 2, and User 3. The shared federated library can include content items or folders received from one or more content servers within the system. In accordance with an embodiment, the content items within the shared federated library can be accessed through any content server within the system. For example, the system can be configured to enable User 2 to access the federated content items through the content server 134 and enable User 3 to access the federated content items through the content server 136.

Federated Metadata Propagation

Figure 3:
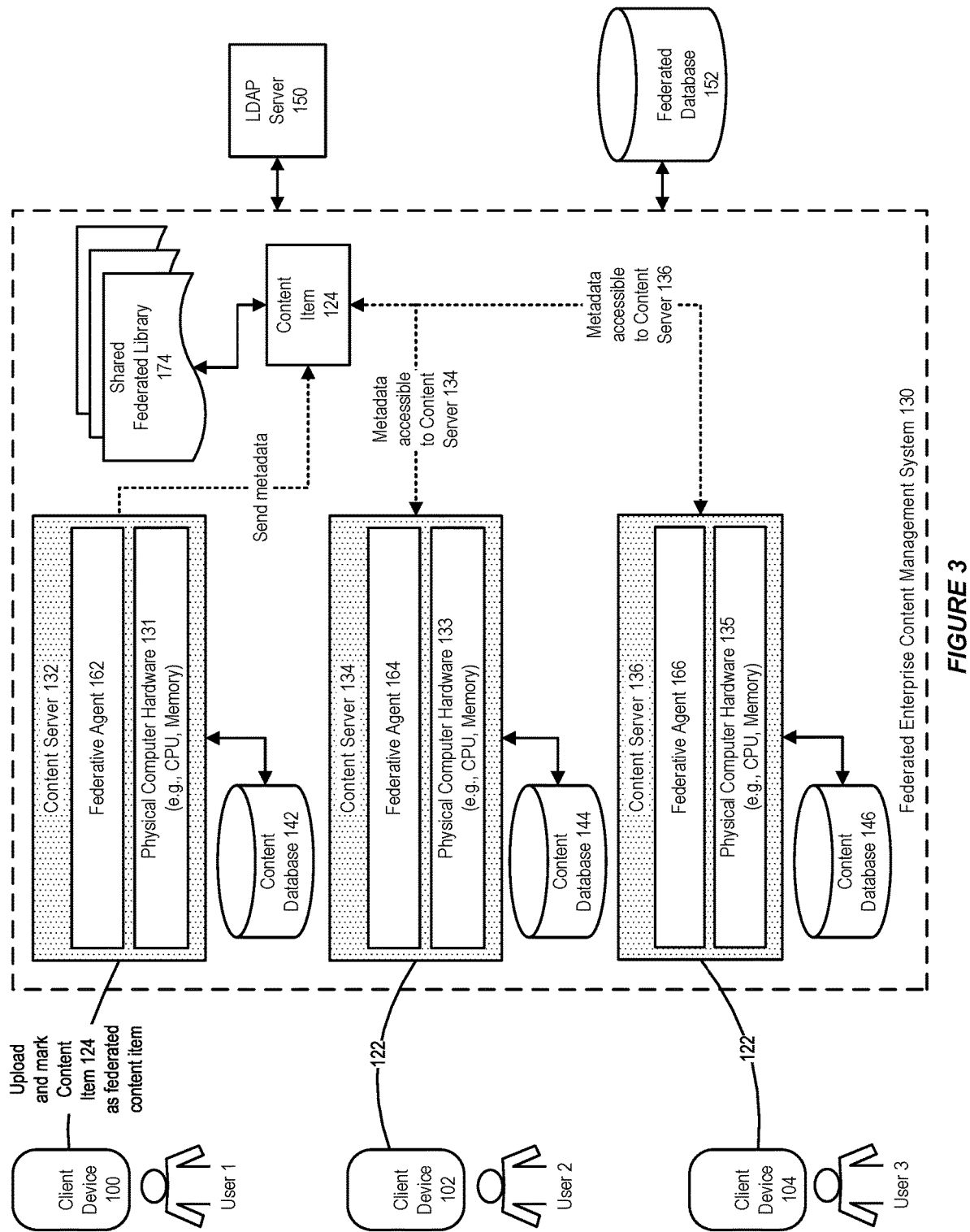
FIG. 3 illustrates a system for enabling federated content management, including federated metadata propagation, in accordance with an embodiment.

FIG. 3 illustrates a system for enabling federated content management, including federated metadata propagation, in accordance with an embodiment.

In accordance with an embodiment, the federative agent at each content server can be configured to propagate metadata associated with content items uploaded to different content servers, to the federated database. For example, each federative agent 162, 164, 166 associated a content server can be configured to send metadata associated with federated content items to the federated database, regardless of where (at which content server within the system) they were uploaded.

For example, as illustrated in FIG. 3, in accordance with an embodiment, the federative agent 162 can be configured to send metadata associated with content item 124, which was uploaded at content server 132, to the federated database in response to receiving an input or request to mark content item 124 as a federated content item. By way of illustration of a non-limiting example, content item 124 can be, for example, a Word document or file, or a Portable Document Format (PDF) document or file, or another type of content item. The foregoing non-limiting example is provided by way of illustration, and in accordance with various embodiments other types of content items can be similarly supported. In accordance with an embodiment, the metadata and actual content can remain at the content server from which it was uploaded, while only a portion of the metadata is communicated to the federated database by the federative agent. For example, only a portion of the metadata such as a content item name, folder identification, and other information associated with a content item can be communicated to the federated database by the federative agent. Once propagated, the pushed metadata associated with the federated content item 124 can be accessible to content servers within the system. For example, the metadata can be accessible through the content server 134 to User 2, and can also be accessible through the content server 136 to User 3.

In accordance with an embodiment, the system can provide an option to propagate metadata to a selected folder within the federated library. For example, the system can be configured to receive an input from a user at a particular content server, where the input is indicative of a request to add a plurality selected documents into a secure group associated with a federated folder. In response to receiving the input, the federative agent can propagate metadata associated with the selected documents to the federated folder, such that the documents are included within the secure group. This process can be performed for a plurality of documents that were uploaded to different content servers within the system.

Example Use Cases

Figure 4:
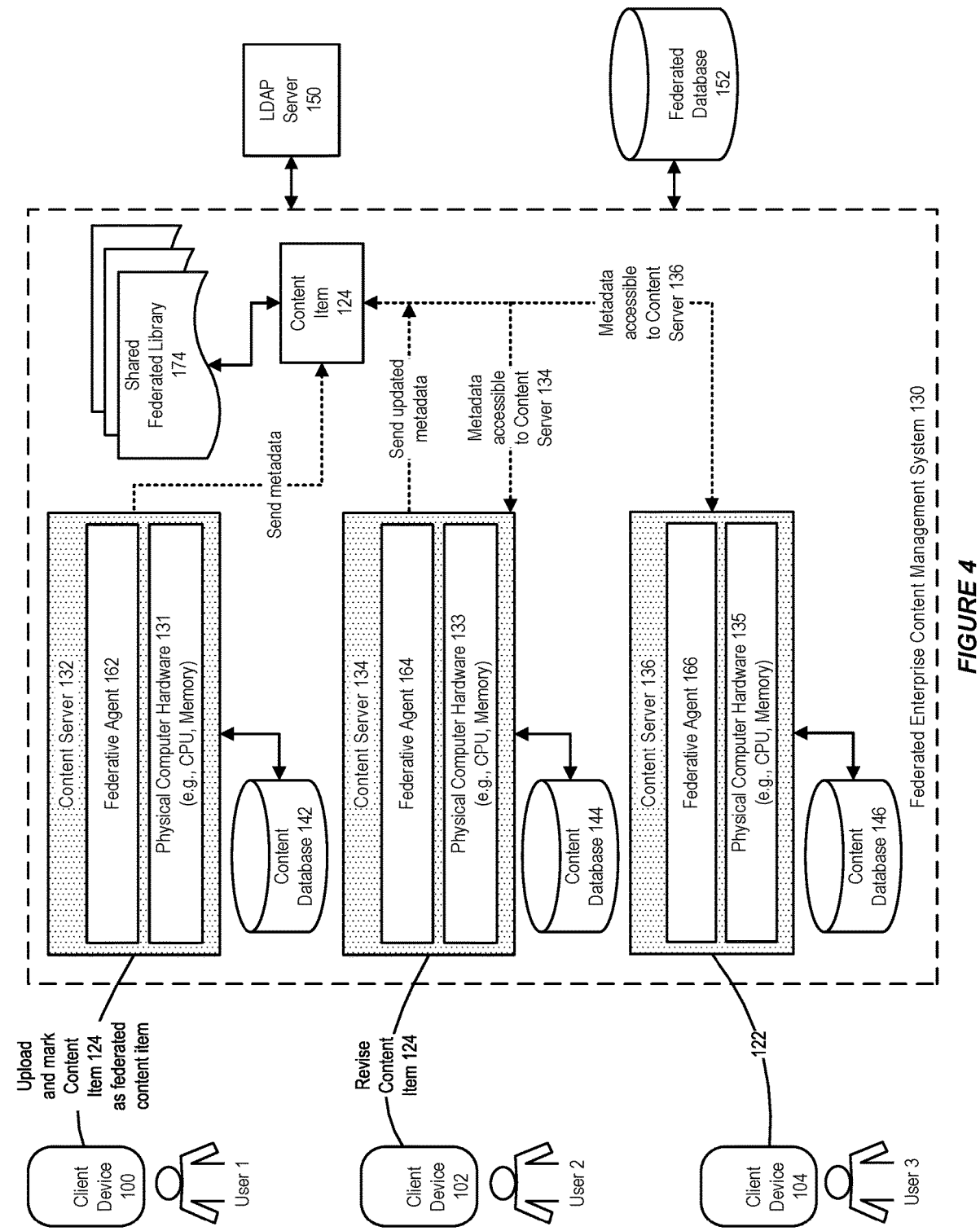
FIG. 4 illustrates enabling federated content management, in accordance with an embodiment.

FIG. 4 illustrates enabling federated content management, in accordance with an embodiment.

In accordance with an embodiment, the federated library can enable shared access to content items among the different content servers within the system. For example, federated content items stored within a federated library can be viewed, accessed, and modified by users logged in to the different content servers.

For example, as illustrated in FIG. 4, in accordance with an embodiment, a content item 124 can be uploaded at the content server 132 and marked as a federated content item by a first user, User 1. In response to receiving the input indicative of marking the content item as a federated content item, the system can include the content item within the federated library, so that it is made accessible to the other content servers 134, 136 within the system and can be accessed by other users. In accordance with an embodiment, the federated library and federated database enable the content item to be accessed, modified, and processed by a user at any of the content servers within the system, even though its content and associated metadata were uploaded and may be physically stored at the content server 132.

In accordance with an embodiment, in response to receiving the input at the content server 132 indicative of marking the content item as a federated content item, the federative agent 162 can send metadata associated with the content item to the federated database.

In accordance with an embodiment, the federated content item can be accessed at a different content server, content server 134, by a different user, User 2. For example, the system can receive a search input or query from User 2 at content server 134, and can provide a list of federated content items as search results, regardless of where (at which content server) the content items were originally uploaded. The system can further enable User 2 revise the federated content item at the content server 134. In response to receiving the revision, metadata associated with the federated content item can be updated and stored at the respective content database 144, and the federative agent 164 can send the updated metadata to the federated database, where it is associated with the content item 124 stored in the federated library. Thereafter, all of the content servers within the system can access the current metadata stored in the federated database.

In accordance with an embodiment, metadata associated with a revised federated content item can be added to the federated database from different content servers within the system, regardless of where (at which content server) the federated content item was uploaded (checked in).

In accordance with an embodiment, the system can be configured to apply processes (life-cycle processes) or operations to federated content items, using content servers that are not configured to have any of these functionalities within themselves. For example, the system can be configured to apply record policies, digital or electronic signatures, workflow rules, or document conversion settings through a content server that is not configured to perform any of these processes, by configuring metadata rules and propagating metadata accordingly. For instance, the content server 132 illustrated in FIG. 4 can be configured to apply workflow rules to content items, while the content server 134 does not have this functionality. In accordance with an embodiment, the system can nevertheless enable application of the workflow rules to federated content items through the content server 134, by using the federative agent to send associated metadata to the federated database, where it can be shared with a content server that does have the requested functionality. From the user's perspective, a wider range of processes and functionalities can be made available through a content server that would not otherwise offer such processes and functionalities.

Figure 5:
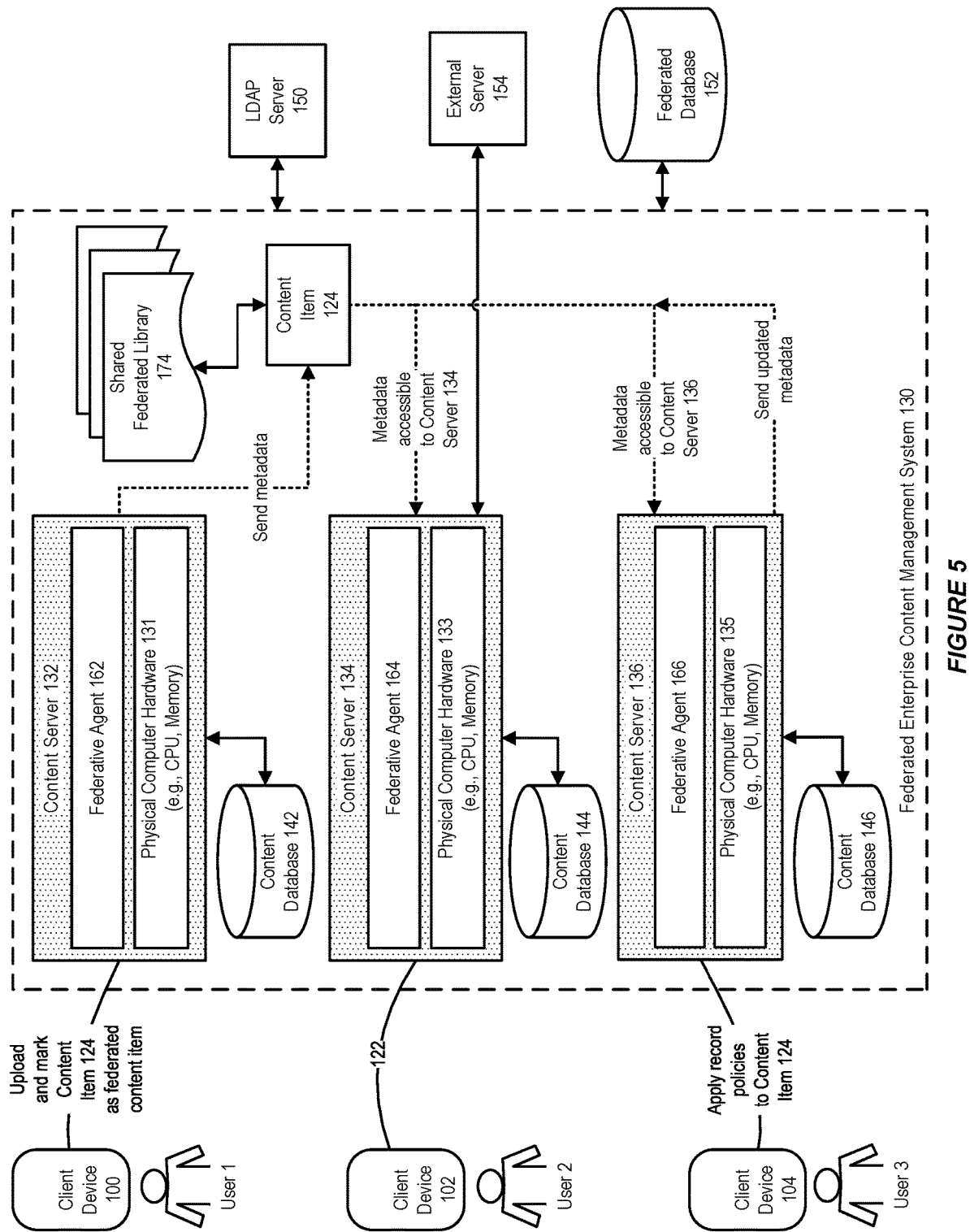
FIG. 5 illustrates enabling federated content management, in accordance with an embodiment.

FIG. 5 illustrates enabling federated content management, in accordance with an embodiment.

In accordance with an embodiment, one of the content servers within the system can be configured to communicate with to one or more external servers, such as a document conversion server, imaging server, or record management server. In accordance with an embodiment, the system enables content items uploaded at any of the content servers within the system to be further processed by the one or more external servers.

For example, as illustrated in FIG. 5, in accordance with an embodiment, the content server 134 can be coupled to or otherwise in communication with an external server 154, which can be a record management server configured to apply record policies. The system can be configured to provide access to the content item 124 (which was uploaded and marked as a federated content item by User 1 at the content server 132), via any of the content servers in the system. The federated library enables User 3 to access the federated content item 124 at the content server 136, and to apply record policies thereto, even though the content server 136 is not itself in communication with the record management server. In response to receiving an input indicative of applying a record policy to the federated content item at the content server 136, the federative agent 166 can send updated metadata associated with the applied policy, to the federated database.

Usage Data

Figure 6:
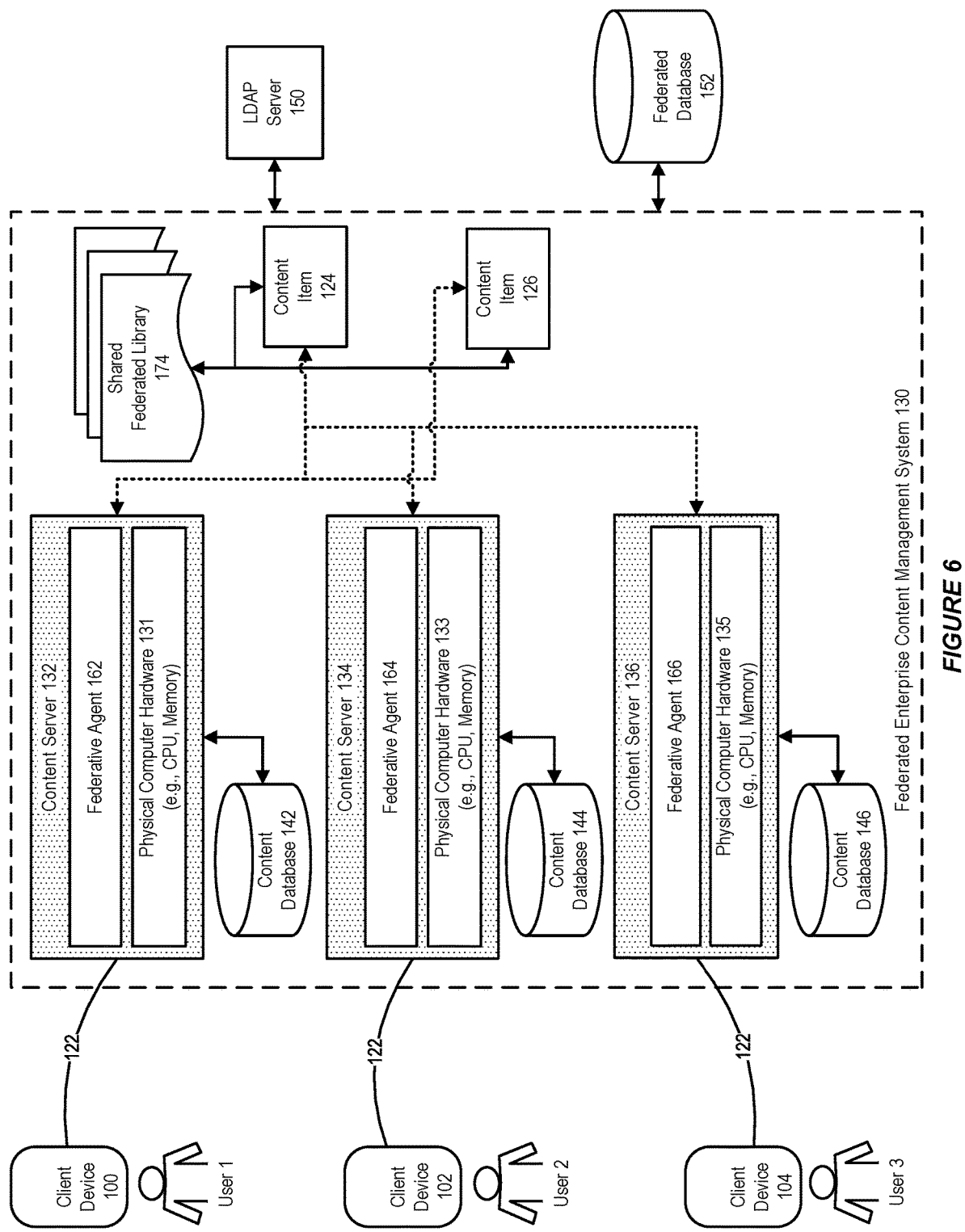
FIG. 6 illustrates a system for enabling federated content management, in accordance with an embodiment.

FIG. 6 illustrates a system for enabling federated content management, in accordance with an embodiment.

As illustrated in FIG. 6, in accordance with an embodiment, two federated content items, content item 124 and content item 126, can be stored within a shared federated library. By way of illustration of a non-limiting example, content item 124 can be, for example, a Word document or file, or another type of content item; while content item 126 can be, for example, a PDF document or file, or another type of content item. The foregoing non-limiting example is provided by way of illustration, and in accordance with various embodiments other types of content items can be similarly supported. The federated content item 124 and its associated metadata are accessible to each of the content servers 132, 134, 136. The federated content item 126 and its associated metadata are also accessible to each of the content servers 132, 134, 136, but only User 1 is permitted access.

In accordance with an embodiment, the system can be configured to provide an indication (snapshot) of usage data of each federated content item with respect to a particular content server. In accordance with an embodiment, the usage data can describe a frequency (e.g., number of hits) with which a particular content item is accessed through a particular content server. The usage data can correspond to or represent a period of time since with the content item was first marked as a federated content item, until the time at which the snapshot was generated. The snapshot can therefore provide an indication of a usage pattern over time for a particular content item with respect to a particular content server.

Figure 7:
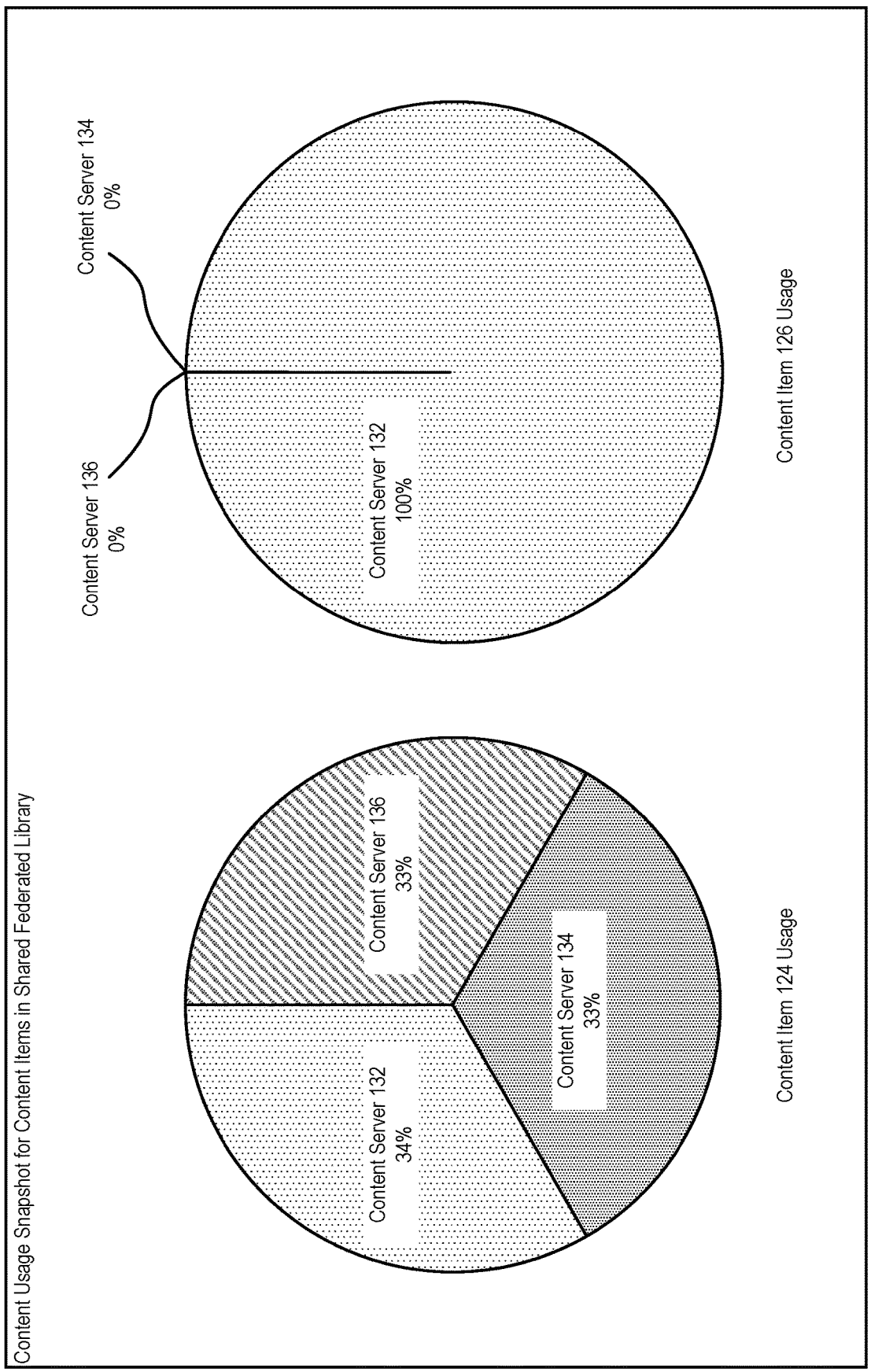
FIG. 7 illustrates a content usage snapshot, in accordance with an embodiment.

FIG. 7 illustrates a content usage snapshot, in accordance with an embodiment.

As illustrated in FIG. 7, in accordance with an embodiment, the content usage associated with the content items 124 and 126 stored within a shared federated library can be indicated by pie charts and percentages. As illustrated by the pie chart on the left, the content item 124 has been accessed by each of the content servers (132, 134, 136) with substantially equal frequency. As illustrated by the pie chart on the right, the content item 126 has been accessed by only the content server 132. Although in FIG. 7 the usage data is represented by pie charts, embodiments are not limited thereto, and the usage data can be represented in any suitable manner.

Figure 8:
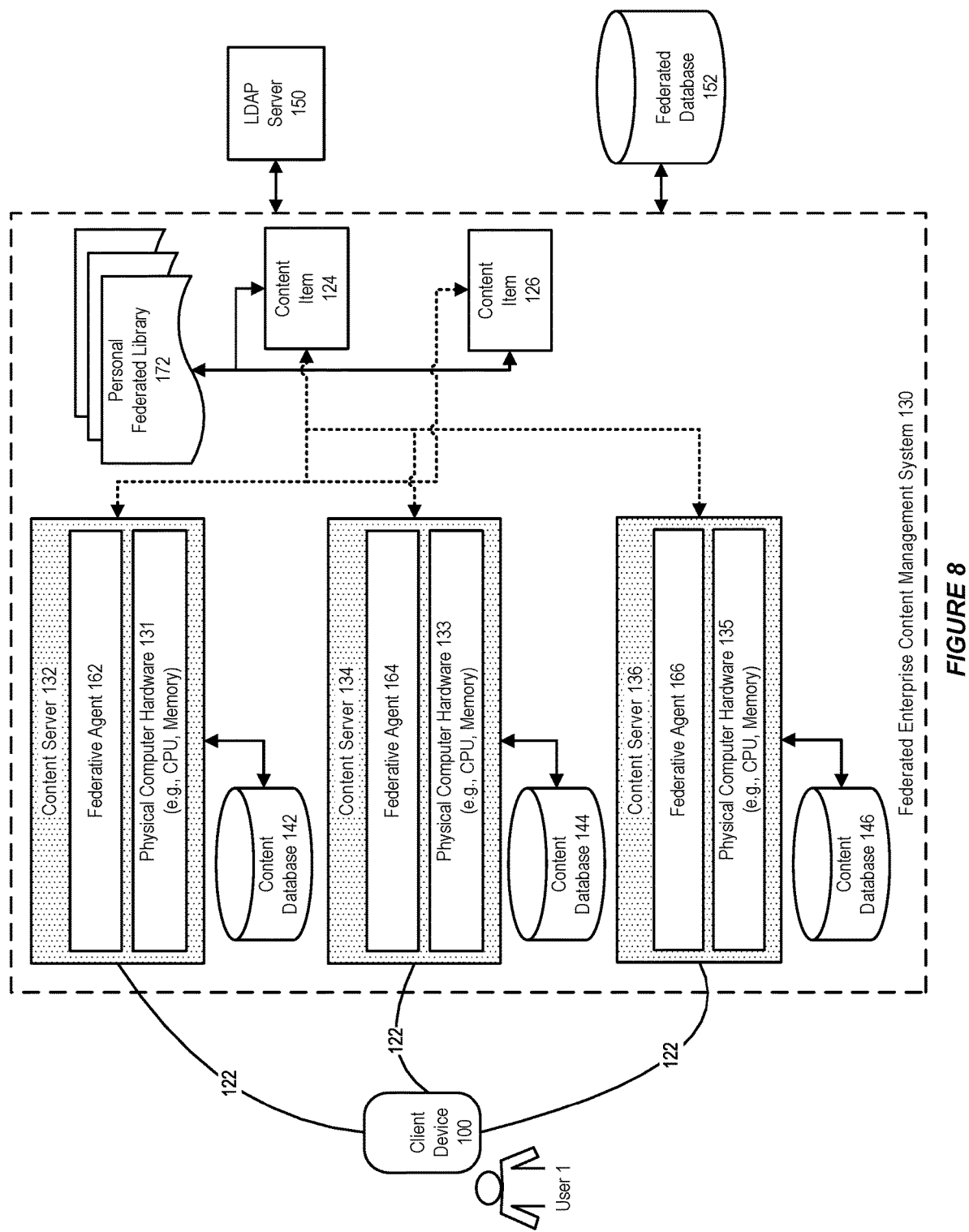
FIG. 8 illustrates a system for enabling federated content management, in accordance with an embodiment.

FIG. 8 illustrates a system for enabling federated content management, in accordance with an embodiment.

As illustrated in FIG. 8, in accordance with an embodiment, two federated content items, content items 124 and 126, can be stored within a personal federated library associated with User 1. For example, User 1 can upload the content items 124, 126, which are personal to him, and each of the content items 124, 126, and metadata associated therewith, can be accessed by User 1 from any of the content servers within the system.

Figure 9:
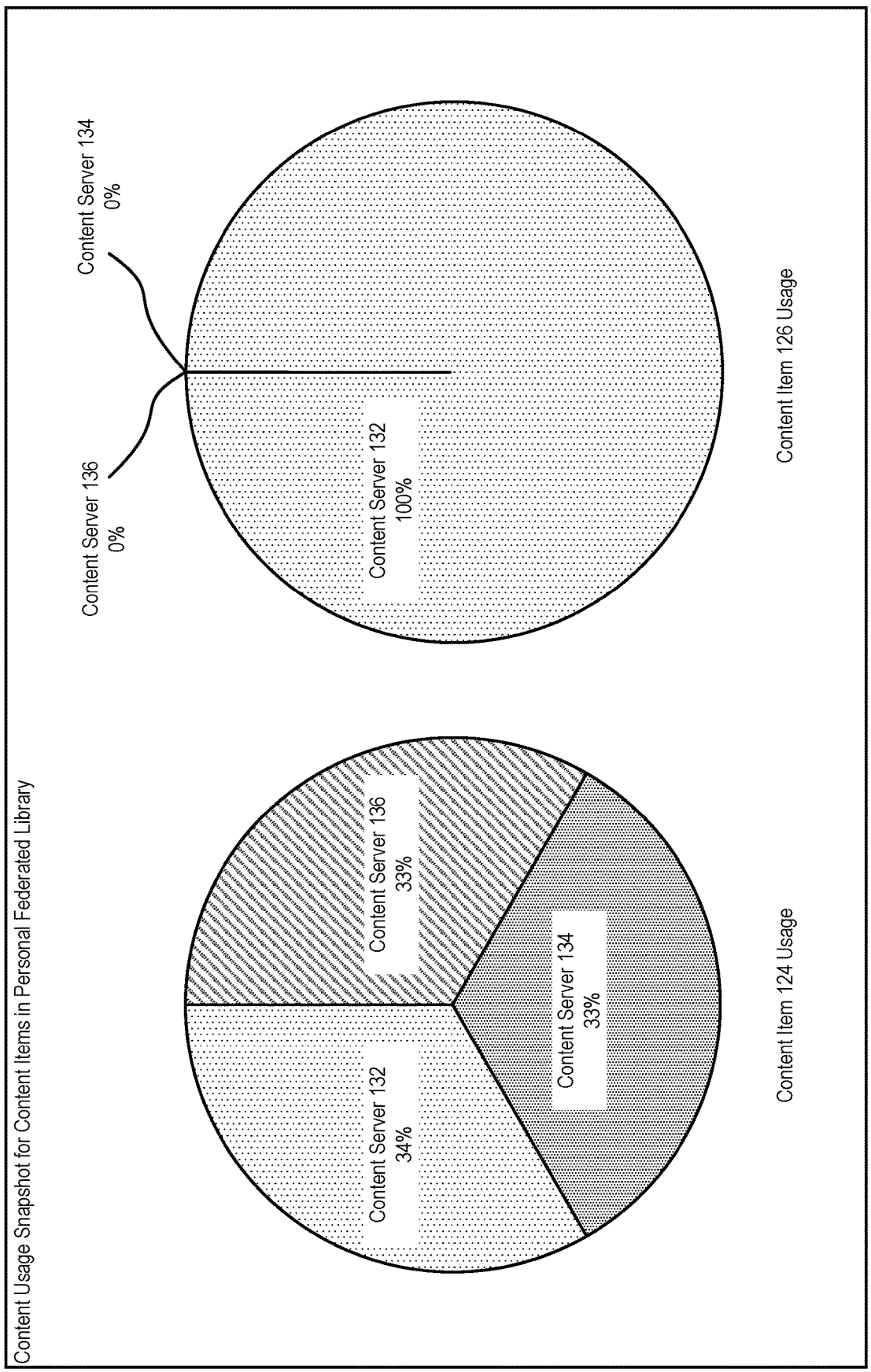
FIG. 9 illustrates a content usage snapshot, in accordance with an embodiment.

FIG. 9 illustrates a content usage snapshot, in accordance with an embodiment.

As illustrated in FIG. 9, in accordance with an embodiment, the content usage associated with the content items 124 and 126 stored within a personal federated library can be indicated by pie charts and percentages. As illustrated by the pie chart on the left, the content item 124 has been accessed by each of the content servers (132, 134, 136) with substantially equal frequency. As illustrated by the pie chart on the right, the content item 126 has been accessed by only the content server 132. Although in FIG. 9 the usage data is represented by pie charts, embodiments are not limited thereto, and the usage data can be represented in any suitable manner.

Local Pull of Federated Content Items

Figure 10:
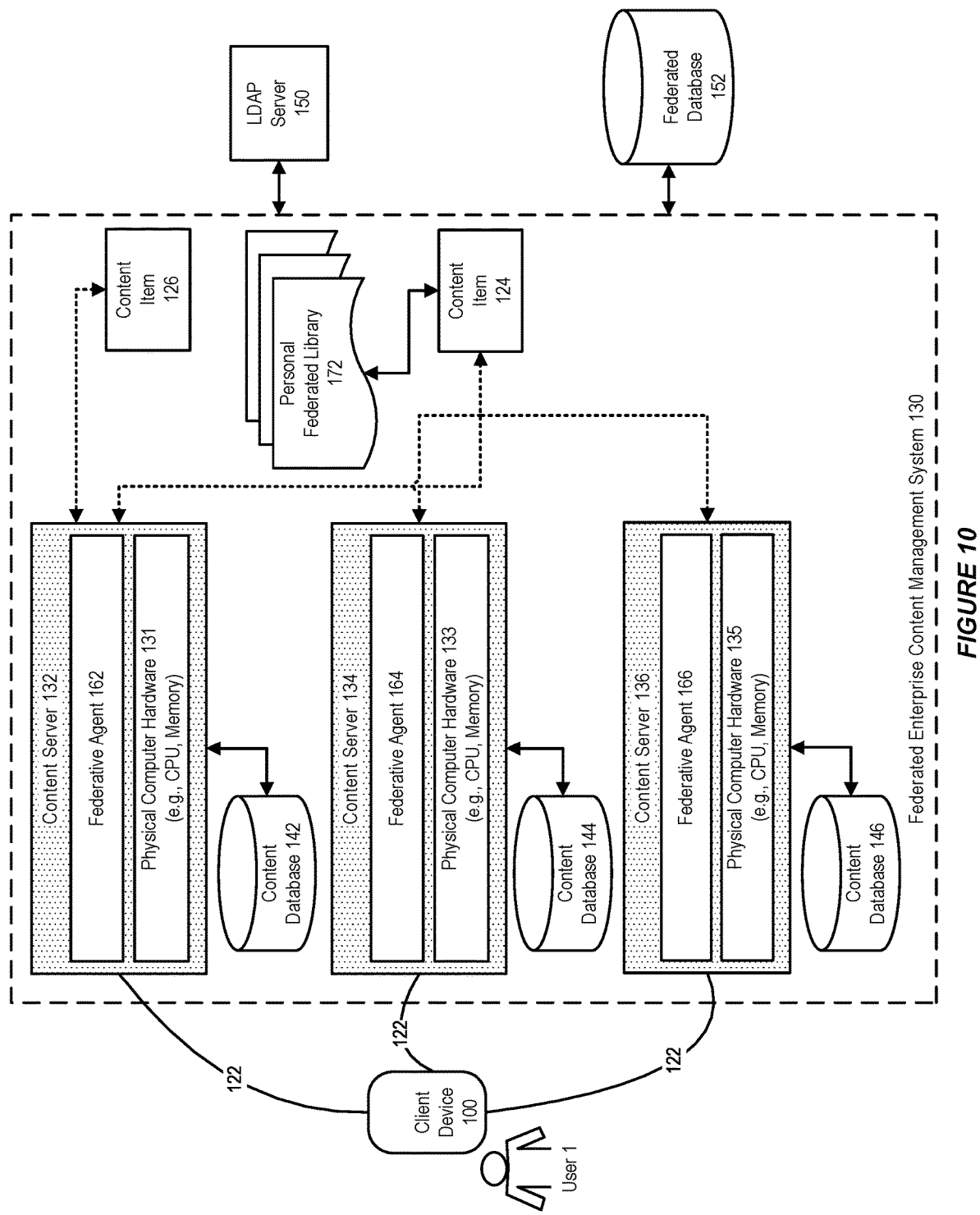
FIG. 10 illustrates a system for enabling federated content management, in accordance with an embodiment.

FIG. 10 illustrates a system for enabling federated content management, in accordance with an embodiment.

In accordance with an embodiment, the system can be configured to provide an option to move (pull) content local to any of the content servers within the system, regardless of from where (at which content server) the content item was originally uploaded.

For example, as illustrated in FIGS. 7 and 9, in accordance with an embodiment, the system can be configured to determine, based on a usage data, that a content item such as content item 126, which is personal to User 1, has only been accessed by User 1 through the content server 132. The system can be configured to provide an option to User 1 to pull the content item 126 local to the content server 132, thereby removing the content item from the federated library.

In accordance with an embodiment, the system can be configured to periodically determine usage data for each content item with respect to each content server within the system, and to provide a list of suggested items for local pull, based on the usage data.

In accordance with an embodiment, after a federated content item is pulled local to a content server within the system, the system (e.g., the federative agent) can send the current metadata for the content item from the federated database to the corresponding content server's respective content database, and can discard or otherwise remove the metadata from the federated database.

In accordance with an embodiment, the system can be configured to enable a user to pull federated content items local to any content server, regardless of which content server the user is logged into, and regardless of where (at which content server) the content items where uploaded. In some embodiments, the option to perform a local pull can be restricted according to access permissions for particular users.

In accordance with an embodiment, by providing the option to perform a local pull of federated content items, the number of and space occupied by federated content items within the system can be reduced, which can improve the efficiency of responding to federated searches. Additionally, in accordance with an embodiment in which content servers within the system are geographically distributed at different locations, pulling a content item local to a content server that is geographically closer to a location from which the content item will be accessed, can reduce network latency in accessing the content item.

Figure 11:
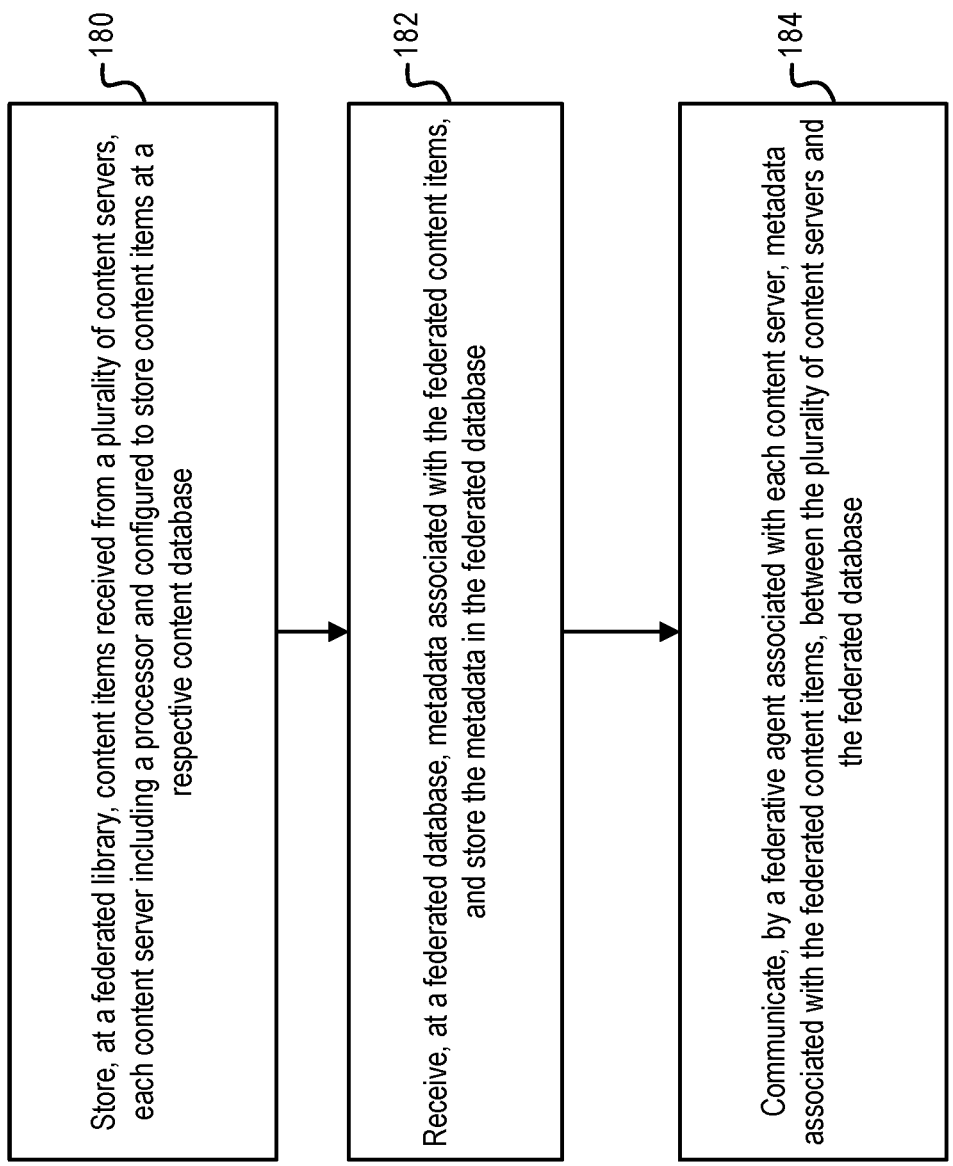
FIG. 11 illustrates a flow chart describing a method of enabling federated content management, in accordance with an embodiment, in accordance with an embodiment.

FIG. 11 illustrates a system for enabling federated content management, in accordance with an embodiment.

As illustrated in FIG. 11, in accordance with an embodiment, at operation 180, the system is configured to store, at a federated library, content items received from a plurality of content servers, each content server including a processor and configured to store content items at a respective content database. The content items can be stored in the federated library as federated content items accessible to each content server of the plurality of content servers.

In accordance with an embodiment, at operation 182, the system is configured to receive, at a federated database, metadata associated with the federated content items, and store the metadata in the federated database.

In accordance with an embodiment, at operation 184, the system is configured to communicate, by a federative agent associated with each content server, metadata associated with the federated content items, between the plurality of content servers and the federated database.

While various embodiments of the present invention have been described above, it should be understood that they have been presented by way of example, and not limitation. The embodiments were chosen and described in order to explain the principles of the invention and its practical application. The embodiments illustrate systems and methods in which the present invention is utilized to improve the performance of the systems and methods by providing new and/or improved features and/or providing benefits such as reduced resource utilization, increased capacity, improved efficiency, and reduced latency.

In some embodiments, features of the present invention are implemented, in whole or in part, in a computer including a processor, a storage medium such as a memory and a network card for communicating with other computers. In some embodiments, features of the invention are implemented in a distributed computing environment in which one or more clusters of computers is connected by a network such as a Local Area Network (LAN), switch fabric network (e.g. InfiniBand), or Wide Area Network (WAN). The distributed computing environment can have all computers at a single location or have clusters of computers at different remote geographic locations connected by a WAN.

In some embodiments, features of the present invention are implemented, in whole or in part, in a cloud as part of, or as a service of, a cloud computing system based on shared, elastic resources delivered to users in a self-service, metered manner using Web technologies. Characteristics of the cloud can include on-demand self-service; broad network access; resource pooling; rapid elasticity; and measured service. Examples of cloud deployment models include: Public, Private, and Hybrid. Examples of cloud service models include Software as a Service (SaaS), Platform as a Service (PaaS), Database as a Service (DBaaS), and Infrastructure as a Service (IaaS). As used herein, the cloud can be a combination of hardware, software, network, and web technologies which delivers shared elastic resources to users in a self-service, metered manner. Unless otherwise specified the cloud, as used herein, encompasses public cloud, private cloud, and hybrid cloud embodiments, and all cloud deployment models including, but not limited to, cloud SaaS, cloud DBaaS, cloud PaaS, and cloud IaaS.

In some embodiments, features of the present invention are implemented using, or with the assistance of hardware, software, firmware, or combinations thereof. In some embodiments, features of the present invention are implemented using a processor configured or programmed to execute one or more functions of the present invention. The processor is in some embodiments a single or multi-chip processor, a digital signal processor (DSP), a system on a chip (SOC), an application specific integrated circuit (ASIC), a field programmable gate array (FPGA) or other programmable logic device, state machine, discrete gate or transistor logic, discrete hardware components, or any combination thereof designed to perform the functions described herein. In some implementations, features of the present invention may be implemented by circuitry that is specific to a given function. In other implementations, the features may implemented in a processor configured to perform particular functions using instructions stored e.g. on a computer readable storage media.

In some embodiments, features of the present invention are incorporated in software and/or firmware for controlling the hardware of a processing and/or networking system, and for enabling a processor and/or network to interact with other systems utilizing the features of the present invention. Such software or firmware may include, but is not limited to, application code, device drivers, operating systems, virtual machines, hypervisors, application programming interfaces, programming languages, and execution environments/containers. Appropriate software coding can readily be prepared by skilled programmers based on the teachings of the present disclosure, as will be apparent to those skilled in the software art.

In some embodiments, the present invention includes a computer program product which is a storage medium or computer-readable medium (media) having instructions stored thereon/in, which instructions can be used to program or otherwise configure a system such as a computer to perform any of the processes or functions of the present invention. The storage medium or computer readable medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. In particular embodiments, the storage medium or computer readable medium is a non-transitory storage medium or non-transitory computer readable medium.

The foregoing description of the present invention has been provided for the purposes of illustration and description. It is not intended to be exhaustive or to limit the invention to the precise forms disclosed. Many modifications and variations will be apparent to the practitioner skilled in the art.

Additionally, where embodiments of the present invention have been described using a particular series of transactions and steps, it should be apparent to those skilled in the art that the scope of the present invention is not limited to the described series of transactions and steps. Further, where embodiments of the present invention have been described using a particular combination of hardware and software, it should be recognized that other combinations of hardware and software are also within the scope of the present invention. Further, while the various embodiments describe particular combinations of features of the invention it should be understood that different combinations of the features will be apparent to persons skilled in the relevant art as within the scope of the invention such that features of one embodiment may be incorporated into another embodiment. Moreover, it will be apparent to persons skilled in the relevant art that various additions, subtractions, deletions, variations, and other modifications and changes in form, detail, implementation and application can be made therein without departing from the spirit and scope of the invention. It is intended that the broader spirit and scope of the invention be defined by the following claims and their equivalents.

What is claimed is:

1. A system for enabling federated content management, the system comprising:
    a plurality of content servers, each including a processor and configured to store content items at a respective content database of a plurality of content databases;
    a single federated library that stores content items received from the plurality of content servers, as federated content items that are accessible to each content server of the plurality of content servers;
    a federated database associated with the federated library and configured to receive and store metadata associated with the federated content items; and
    a plurality of federative agents, each federative agent operating on a content server of the plurality of contents servers;
    wherein each federative agent is configured to push metadata associated with the federated content items from the content server on which said each federative agent operates to the federated database; and
    wherein each of the plurality of content severs is configured to provide access to federated content items in the respective databases of each other of the plurality of content severs using the metadata associated with the federated content items stored in the single federated library.

2. The system of claim 1, wherein the federative agent is configured to receive a request to mark a content item stored at a content server of the plurality of content servers, as a federated content item, and in response to the request, send metadata associated with the content item from the content server to the federated database.

3. The system of claim 2, wherein the federated content item was uploaded at a first content server of the plurality of content servers, and a revision to the federated content item is received at a second content server of the plurality of content servers.

4. The system of claim 3, wherein the federative agent is configured to, in response to receiving the revision to the content item at the second content server of the plurality of content servers, send updated metadata from the second content server to the federated database.

5. The system of claim 1, wherein access to the federated content items stored within the federated library is limited to a particular user.

6. The system of claim 1, wherein a first content server of the plurality of content servers is configured to communicate with an external server, for processing of content items, and the federated library is configured to make federated content items uploaded at content servers other than the first content server, accessible to the external server.

7. The system of claim 1, wherein the federative agent is configured to move a federated content item from the federated library to a selected one of the plurality of content servers, to be stored locally, and to remove metadata associated with the locally stored content item from the federated database.

8. The system of claim 7, wherein the federative agent is configured to move the federated content item to the selected one of the plurality of content servers based on a usage data indicating a frequency of access of the federative content item with respect to each content server of the plurality of content servers.

9. A method for enabling federated content management, comprising:
   storing, at a single federated library associated with a federated database, content items received from a plurality of content servers, each content server including a processor and configured to store content items at a respective content database, wherein the content items are stored in the federated library as federated content items that are accessible to each content server of the plurality of content servers; and
   providing a plurality of federative agents operating on the plurality of content servers, wherein each content server is associated with a federative agent;
   using each of the plurality of federative agents on each of the plurality of content servers to push metadata associated with the federated content items on said each of the plurality of content servers from the content server to the federated database;
   receiving, at the federated database, from the plurality of content servers, metadata associated with the federated content items, and storing the metadata in the federated database; and
   providing access, via each of the plurality of content severs, to federated content items in the respective databases of each other of the plurality of content severs using the metadata associated with the federated content items stored in the single federated library.

10. The method of claim 9, further comprising receiving a request to mark a content item stored at a content server of the plurality of content servers, as a federated content item, and in response to the request, sending, by the federative agent, metadata associated with the content item from the content server to the federated database.

11. The method of claim 10, wherein the federated content item was uploaded at a first content server of the plurality of content servers, and the method further comprises receiving a revision to the federated content item at a second content server of the plurality of content servers.

12. The method of claim 11, further comprising sending, in response to receiving the revision to the content item at the second content server of the plurality of content servers, updated metadata from the second content server to the federated database.

13. The method of claim 9, wherein a first content server of the plurality of content servers is configured to communicate with an external server, for processing of content items, and the method further comprises making federated content items uploaded at content servers other than the first content server, accessible to the external server.

14. The method of claim 9, further comprising moving a federated content item from the federated library to a selected one of the plurality of content servers, to be stored locally, and removing metadata associated with the locally stored content item from the federated database.

15. The method of claim 14, further comprising moving the federated content item to the selected one of the plurality of content servers based on a usage data indicating a frequency of access of the federative content item with respect to each content server of the plurality of content servers.

16. A non-transitory computer-readable storage medium having instructions stored thereon for enabling federated content management, which instructions, when read and executed by a computer, cause the computer to perform steps comprising:
   storing, at a single federated library associated with a federated database, content items received from a plurality of content servers, each content server including a processor and configured to store content items at a respective content database, wherein the content items are stored in the federated library as federated content items that are accessible to each content server of the plurality of content servers; and
   providing a plurality of federative agents operating on the plurality of content servers, wherein each content server is associated with a federative agent;
   using each of the plurality of federative agents on each of the plurality of content servers to push metadata associated with the federated content items on said each of the plurality of content servers from the content server to the federated database;
   receiving, at the federated database, from the plurality of content servers, metadata associated with the federated content items, and storing the metadata in the federated database; and
   providing access, via each of the plurality of content severs, to federated content items in the respective databases of each other of the plurality of content severs using the metadata associated with the federated content items stored in the single federated library.

17. The non-transitory computer-readable storage medium of claim 16, wherein the instructions further cause the computer to receive a request to mark a content item stored at a content server of the plurality of content servers, as a federated content item, and in response to the request, send, by the federative agent, metadata associated with the content item from the content server to the federated database.

18. The non-transitory computer-readable storage medium of claim 17, wherein the federated content item was uploaded at a first content server of the plurality of content servers, and the instructions further cause the computer to receive a revision to the federated content item at a second content server of the plurality of content servers and send, in response thereto, updated metadata from the second content server to the federated database.

19. The non-transitory computer-readable storage medium of claim 16, wherein a first content server of the plurality of content servers is configured to communicate with an external server, for processing of content items, and the instructions further cause the computer to make federated content items uploaded at content servers other than the first content server, accessible to the external server.

20. The non-transitory computer-readable storage medium of claim 16, wherein the instructions further cause the computer to move a federated content item from the federated library to a selected one of the plurality of content servers, to be stored locally, and remove metadata associated with the locally stored content item from the federated database.

\* \* \* \* \*

UNITED STATES PATENT AND TRADEMARK OFFICE
CERTIFICATE OF CORRECTION

PATENT NO. : 11,113,339 B2  
APPLICATION NO. : 15/870474  
DATED : September 7, 2021  
INVENTOR(S) : Arasachetty et al.

Page 1 of 1

It is certified that error appears in the above-identified patent and that said Letters Patent is hereby corrected as shown below:

In the Claims

In Column 12, in Claim 1, Line 54, delete "severs" and insert -- servers --, therefor.

In Column 12, in Claim 1, Line 57, delete "severs" and insert -- servers --, therefor.

In Column 13, in Claim 9, Line 53, delete "severs," and insert -- servers, --, therefor.

In Column 13, in Claim 9, Line 55, delete "severs" and insert -- servers --, therefor.

In Column 14, in Claim 16, Line 50, delete "severs," and insert -- servers, --, therefor.

In Column 14, in Claim 16, Line 52, delete "severs" and insert -- servers --, therefor.

Signed and Sealed this  
Fifteenth Day of February, 2022

Drew Hirshfeld  
*Performing the Functions and Duties of the*  
*Under Secretary of Commerce for Intellectual Property and*  
*Director of the United States Patent and Trademark Office*